United States Patent
Laurens

(10) Patent No.: US 9,234,561 B2
(45) Date of Patent: Jan. 12, 2016

(54) VIBRATION ISOLATING DEVICE

(75) Inventor: Philippe Laurens, Beauteville (FR)

(73) Assignee: AIRBUS DEFENCE AND SPACE SAS, Les Mureaux (FR)

(*) Notice: Subject to any disclaimer, the term of this patent is extended or adjusted under 35 U.S.C. 154(b) by 102 days.

(21) Appl. No.: 13/988,844

(22) PCT Filed: Nov. 22, 2011

(86) PCT No.: PCT/EP2011/070705
§ 371 (c)(1),
(2), (4) Date: Jul. 30, 2013

(87) PCT Pub. No.: WO2012/069487
PCT Pub. Date: May 31, 2012

(65) Prior Publication Data
US 2013/0299669 A1 Nov. 14, 2013

(30) Foreign Application Priority Data
Nov. 23, 2010 (FR) ...................... 10 04541

(51) Int. Cl.
*F16M 13/00* (2006.01)
*F16F 15/08* (2006.01)
*B64G 1/38* (2006.01)
*B64G 1/66* (2006.01)
(Continued)

(52) U.S. Cl.
CPC . *F16F 15/08* (2013.01); *B64G 1/38* (2013.01); *B64G 1/641* (2013.01); *B64G 1/66* (2013.01); *B64G 2001/228* (2013.01)

(58) Field of Classification Search
USPC ......... 248/560, 564, 566, 570, 603, 604, 610, 248/612, 614, 626, 627, 636; 244/173.2; 267/141
See application file for complete search history.

(56) References Cited

U.S. PATENT DOCUMENTS

| | | | | |
|---|---|---|---|---|
| 3,066,905 A | * | 12/1962 | Gertel | 248/570 |
| 3,592,422 A | * | 7/1971 | Paine et al. | 248/589 |
| 4,848,525 A | * | 7/1989 | Jacot et al. | 188/378 |

(Continued)

FOREIGN PATENT DOCUMENTS

| | | |
|---|---|---|
| DE | 10 2004 025725 A1 | 12/2005 |
| FR | 2 895 052 A1 | 6/2007 |

(Continued)

OTHER PUBLICATIONS

International Search Report, dated Apr. 22, 2013, from corresponding PCT application.

*Primary Examiner* — Terrell McKinnon
*Assistant Examiner* — Michael McDuffie
(74) *Attorney, Agent, or Firm* — Young & Thompson

(57) ABSTRACT

A vibration isolation device designed to be positioned between a structure (10) and an equipment anchor plate (11), includes a lattice made of bars, with each bar including at least one axial actuator (25), the lattice being an active hexapod including six identical isolation bars (12) positioned according to a regular geometry, the six bars (12) being arranged such that the control of the tension-compression forces in each of the six bars (12) makes possible the force and torque control of six separate degrees of freedom at the interface between the structure and the equipment, so as to produce effective isolation along all the system's degrees of freedom. At least one end-fitting of each bar consists of an element (16) made of elastomeric material (called "elastomeric element").

14 Claims, 3 Drawing Sheets

(51) Int. Cl.
*B64G 1/64* (2006.01)
*B64G 1/22* (2006.01)

(56) References Cited

U.S. PATENT DOCUMENTS

| | | | |
|---|---|---|---|
| 5,305,981 A * | 4/1994 | Cunningham et al. | 248/550 |
| 5,310,157 A * | 5/1994 | Platus | 248/619 |
| 5,529,277 A * | 6/1996 | Ostaszewski | 248/603 |
| 5,730,429 A | 3/1998 | Ivers et al. | |
| 6,068,821 A * | 5/2000 | VanDeGraaf | 422/300 |
| 6,402,329 B1 * | 6/2002 | Bailly et al. | 359/872 |
| 7,063,300 B2 * | 6/2006 | Billet | 248/476 |
| 7,604,215 B1 * | 10/2009 | Miller et al. | 248/603 |
| 7,883,071 B2 * | 2/2011 | Fox et al. | 248/560 |
| 7,950,633 B2 * | 5/2011 | Hiley et al. | 267/136 |
| 8,179,621 B2 * | 5/2012 | Muehlbeyer et al. | 359/822 |
| 8,453,512 B2 * | 6/2013 | Sasso et al. | 73/668 |
| 2005/0109912 A1 * | 5/2005 | Mulder | 248/564 |
| 2008/0191118 A1 * | 8/2008 | Johnson et al. | 248/638 |
| 2009/0008504 A1 * | 1/2009 | Camarasa | 244/173.2 |
| 2010/0125404 A1 * | 5/2010 | Anderson | 701/200 |
| 2010/0264290 A1 * | 10/2010 | Camarasa | 248/603 |

FOREIGN PATENT DOCUMENTS

| | | |
|---|---|---|
| FR | 2 924 191 A1 | 5/2009 |
| JP | 59 065640 A | 4/1984 |
| JP | 63 053617 A | 3/1988 |

* cited by examiner

VIBRATION ISOLATING DEVICE

This invention relates to a vibration isolating device. It relates more specifically to the field of isolating micro-vibrations.

BACKGROUND OF THE INVENTION AND PROBLEM STATEMENT

Some satellites comprise equipment that generates vibratory disruptions, which can be transmitted by the structure to payload elements sensitive to these disturbances. This is about isolating disruptive equipment by adequate devices that attenuate the vibrations they transmit to the load-bearing structure and/or isolating sensitive elements from the disturbances generated by using the same type of devices.

In the field of isolating equipment that generates disruptions or sensitive elements from vibrations, several types of solution are currently known.

A first family of solutions utilizes passive, i.e. inert, isolators usually taking the form of elastomer blocks, strips, springs, etc. Such devices are efficient in regards to high-frequency disturbances, but are inoperative on low-frequency disruptions, which may even be amplified in certain circumstances (in particular in frequency bands close to the resonance frequencies of the suspension).

Alternatively, it is known, in particular for expensive equipment that is highly sensitive to vibration, to implement active systems, i.e. devices comprising firstly a means of measuring the disruptions (forces or accelerations) induced by the vibrations within a target frequency bandand, secondly, means of generating corrective actions to defeat the induced disruptive effects. In this way, the transmitted vibrations are attenuated. However, these systems are only effective within a small frequency domain, characterized by the bandwidth of the active control.

In the case of an application more specific to equipment installed in a satellite, the state of the art as regards isolating disruptive equipment utilizes passive elements, active elements and systems combining an active element and a passive element mounted in parallel or in series.

For example, suspension devices are known in this field, which combine a low-stiffness passive element (spring, flexible strips) and an active element mounted in parallel, with the latter providing some damping thanks to a contactless actuator (e.g. "voice-coil" type).

Entirely passive isolation devices are also known, made of, for example, elastomer blocks (patents FR 2895052 and FR 2924191) and entirely active isolation devices made, for example, of a hexapod of active bars fitted with piezoelectric sensors and actuators mounted in series (publication: *"Technology Predevelopment for active control of vibration and very high accuracy pointing systems"*, A. Defendini and al, ESA's 4th Spacecraft Guidance, Navigation and Control Systems Conference, 1999).

According to the state of the art, these two isolator types may be combined by mounting in series a hexapod of active bars on a passive elastomer-based isolator. In such an assembly, the isolation functions are physically separated:
  passive isolation is performed by elastomer blocks,
  active control in series is realized by the active hexapod.

At the hexapod, flexible mechanical hinge joints are positioned according to the state of the art at the extremity of each bar to provide the isostatic conditions required to eliminate all unwanted mechanical paths allowing vibrations to be transmitted in parallel.

One of the major difficulties inherent to this design comes from this requirement for isostatic conditions within the active lattice. The solutions retained conventionally utilize mechanical elements (strips, micromachined hinge joints, metal membranes, etc.); each one requires an antagonism to be resolved between the two following contradictory requirements:
  realizing the lowest possible bending stiffness so as get close to isostatic conditions,
  the resilience to tension-compression mechanical stresses so as to withstand the launch phase, which produces high stresses.

It is well known that it is very difficult to realize flexible hinge joints designed to withstand the mechanical loads at launch.

This type of isolation device, which is both passive and active by superimposition of known elements, has certain limitations. Firstly, the device does not allow the different elements required for isolation to be incorporated optimally, because the isolation functions are physically separated. Secondly, it does not allow flexible hinge joints providing the required isostatic conditions to be manufactured easily.

OBJECTIVES OF THE INVENTION

The objective of this invention is to propose a vibration isolation device incorporating and combining in optimized fashion both passive and active isolation functions while simultaneously time achieving the mechanical isostatic conditions required at the active element.

DESCRIPTION OF THE INVENTION

To this end, the invention envisages a vibration isolation device designed to be positioned between a load-bearing structure and an anchor plate on which a piece of equipment is fastened. In a first usage case, the equipment is a disruptive element that generates vibrations. The device must attenuate the vibrations transmitted to the structure. In a second usage case, the equipment is an element sensitive to vibrations. The device must attenuate, in the vicinity of the sensitive equipment, the vibrations generated by a disruptive element positioned on the load-bearing structure, where these vibrations are propagated to the equipment by the structure.

The device comprises a lattice made of bars, with each bar comprising at least one axial actuator, with at least one end-fitting of each bar consisting of an element made of elastomeric material (called "elastomeric element").

If the bars have only one elastomer end-fitting, the end-fittings are all positioned on the same side (as close as possible to said structure or as close as possible to said anchor plate).

Advantageously, the two end-fittings of each bar consist of elastomeric elements.

In other words, the invention envisages a hybrid active/passive micro-vibration isolation device, consisting of a lattice of active bars whose end-fittings are elastomeric blocks.

According to an embodiment, the lattice is an active hexapod comprising six identical isolation bars forming a regular lattice.

The elastomeric elements are preferably designed to provide a passive filtering function within a frequency band predefined for a disruptive element with known characteristics.

For example, the material, shape and size of the elastomeric elements of the bars are calculated such that their stiffness in translation (axial and radial) makes it possible to provide a passive filtering function within a predefined frequency band.

The material, shape and size of the elastomeric elements of the bars are also preferably calculated such that their bending stiffness is negligible, so as to provide a ball-joint function for the bars.

Thus, in this architecture, the elements made of elastomeric material have a dual function:
- provide the passive filtering by introducing flexibility in series, with a controlled value (single- or double-stage passive isolation, depending on whether one or both end-fittings of the bars are made of elastomer)
- and also to solve the problem of isostaticity of the lattice of bars, by increasing the degrees of freedom of rotation to at least one root (flexible ball-joint effect).

In a possible embodiment, these elastomeric elements take the form of a membrane in the shape of a hemispheric cap.

Alternatively, the elastomeric elements can also be in the shape of cylindrical blocks. Other types of geometries can also be envisaged, depending on the specific constraints of each application (mainly the filtering frequencies along the six degrees of freedom, the mass and inertia of the suspended portions, the possible fitting and interfacing constraints, etc.)

To realize the active isolation, the device also comprises at least one sensor that measures the effect of the disruptions:
- In the case of a device whose anchor plate carries a disruptive piece of equipment, at least one sensor is used to measure the disruptive forces transmitted to the load-bearing structure. In an advantageous embodiment, at least one such sensor is a load cell, positioned in series in the transmission path of the vibrations, between the actuator of the bars and the structure.
- In the case of a device whose anchor plate carries a piece of equipment sensitive to vibrations, at least one sensor measuring the effects of the disruptions is positioned on the anchor plate. In an advantageous embodiment, such a sensor is an accelerometer.

Functionally, a single- or double-stage passive elastomer isolator is thus combined with an active control acting on all the degrees of freedom.

According to an advantageous embodiment, the device comprises means of limiting the travel of the disruptive equipment in relation to the structure on the three axes, in translation and in rotation, with these means working in parallel with the hexapod, by leaning on the suspended disruptive equipment.

In this case, in a favorable implementation, this device comprises a set of jaws, between which plots fastened to the upper anchor plate come to rest, with stops made of elastomer fastened to the inner surfaces of the jaws to limit the possible travel of the plots.

According to an advantageous embodiment, the device comprises an active control device that feeds back the information measured by at least one sensor regarding the force command of the axial actuators of the bars.

A computing unit (CPU, ASIC, FPGA, etc.) is used to calculate the actuators' force control commands, according to a defined algorithm, based on the measurements provided by the sensors.

An option of production of the algorithm consists in implementing a "wide band" type of control.

According to another embodiment, the device comprises an active control device using a narrow band antiphase-type control.

BRIEF DESCRIPTION OF THE FIGURES

The description that follows, given solely as an example of an embodiment of the invention, is made with reference to the figures included in an appendix, which illustrate.

DETAILED DESCRIPTION OF AN EMBODIMENT OF THE INVENTION

In a first type of application, the vibration isolation device according to the invention is positioned between a piece of equipment, which generates vibrations whose frequency range and amplitudes are known beforehand, as well as a structure that is to be isolated from said vibrations.

In a second type of application, the vibration isolation device according to the invention is positioned between a piece of equipment that is sensitive to vibrations and a structure that propagates the vibrations generated by a disruptive piece of equipment.

The mechanical portion of the device is the same in both cases. Adjustments to the active portion of the device can be implemented to optimize the use of the device depending on the application case.

Figure 2A:
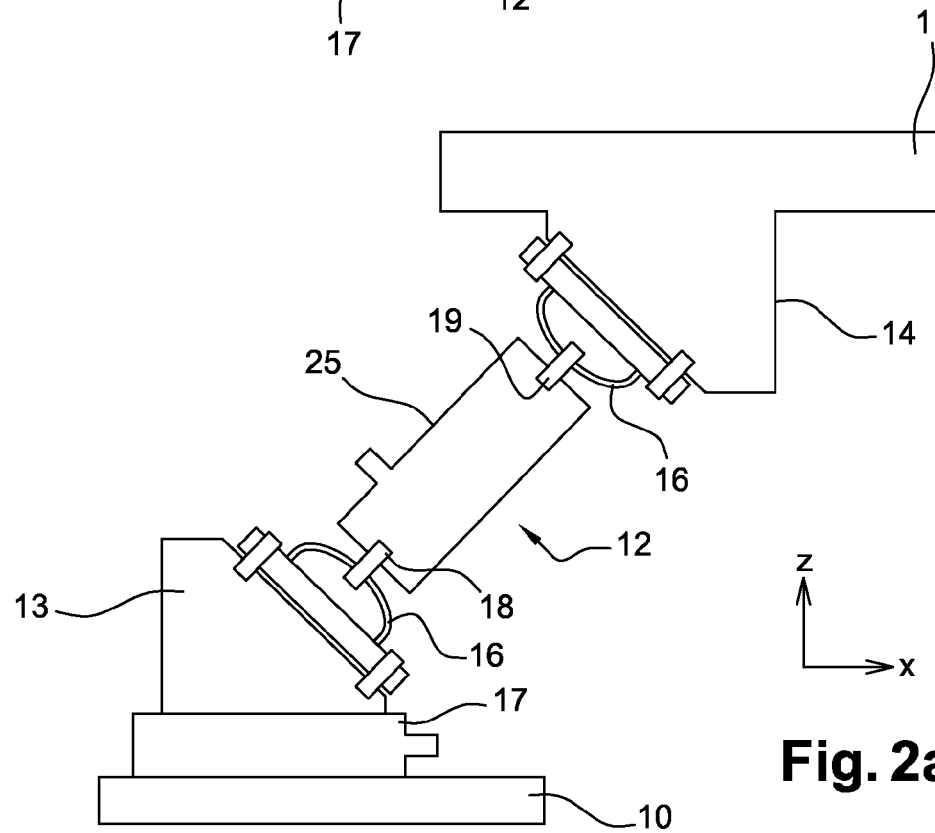
FIG. 2a: a side view of an isolation bar used in an isolator, with a sensor mounted at the base of the bar.
Figure 2B:
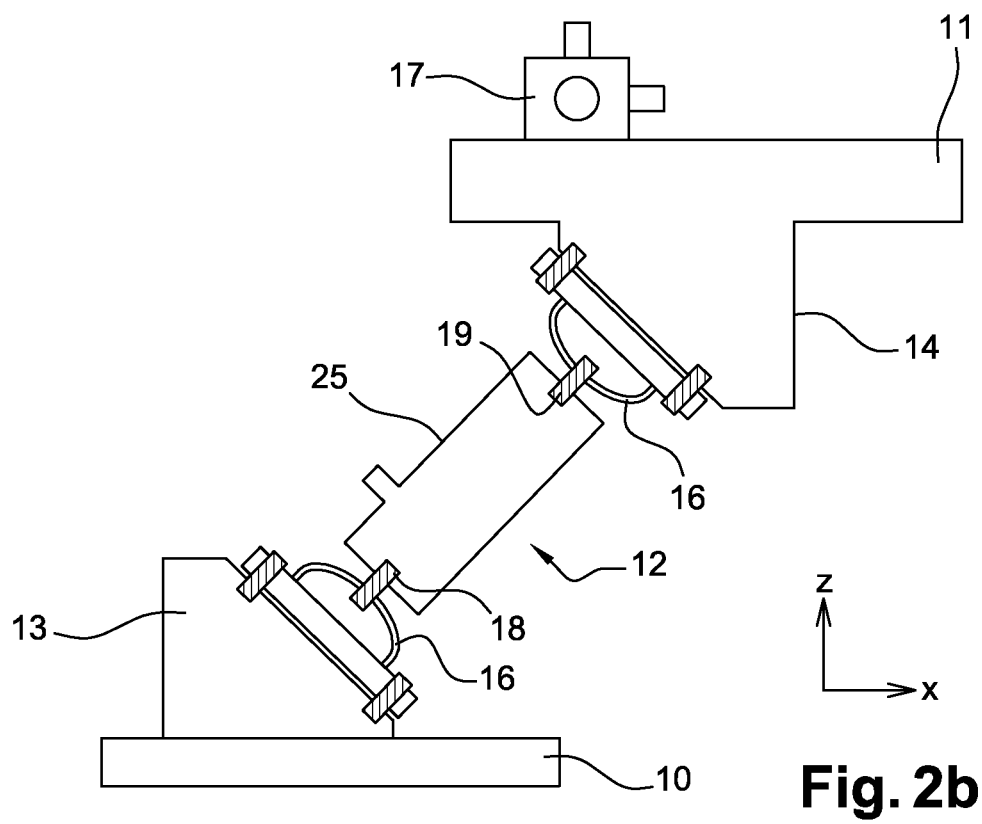
FIG. 2b: a side view of an isolation bar used in an isolator, with a sensor mounted on the anchor plate.

In this non-limiting example, the vibration isolation device is in the form of a hexapod positioned between a structure 10 and an anchor plate 11 that carries the equipment (see FIG. 2a for the case of a disruptive element or FIG. 2b for the case of a sensitive element).

Such a hexapod is used in particular to separate a first surface carrying an instrument from a second surface, which is an element of a satellite's structure.

The hexapod comprises six bars 12 arranged such that the control of the tension-compression forces in each of the six bars 12 makes possible the force and torque control of six separate degrees of freedom at the interface between the structure and the equipment, so as to produce effective isolation along all the system's degrees of freedom.

Arbitrarily, the extremity of the bars 12 fastened to the anchor plate 11 is called "upper extremity" 19 and that fastened to the structure 10 is called "lower extremity" 18.

In this particular assembly, the six bars 12 are identical. The anchor points of the upper extremities of the bars 12 form three pairs of points arranged in a single plane, in the vicinity of the vertices of an equilateral triangle. The same applies to the anchor points of the lower extremities. The planes of the upper and lower anchor points respectively are parallel. The triangle corresponding to the lower anchor points is deduced from the triangle corresponding to the upper anchor points by a 60 degree rotation and a translation from one plane to the other. The axes of each pair of successive bars 12 are substantially concurrent two by two.

A vertical axis Z is defined for the remainder of the description, which is the main axis of the hexapod, here perpendicular to the device's mechanical interface on the structure 10 and to the equipment carrier anchor plate 11. Two horizontal axes called X and Y, which are parallel to the plane of the respectively upper and lower anchor points of the bars 12 and perpendicular to the vertical axis Z and to each other, complete an orthonormal reference space.

Figure 1:
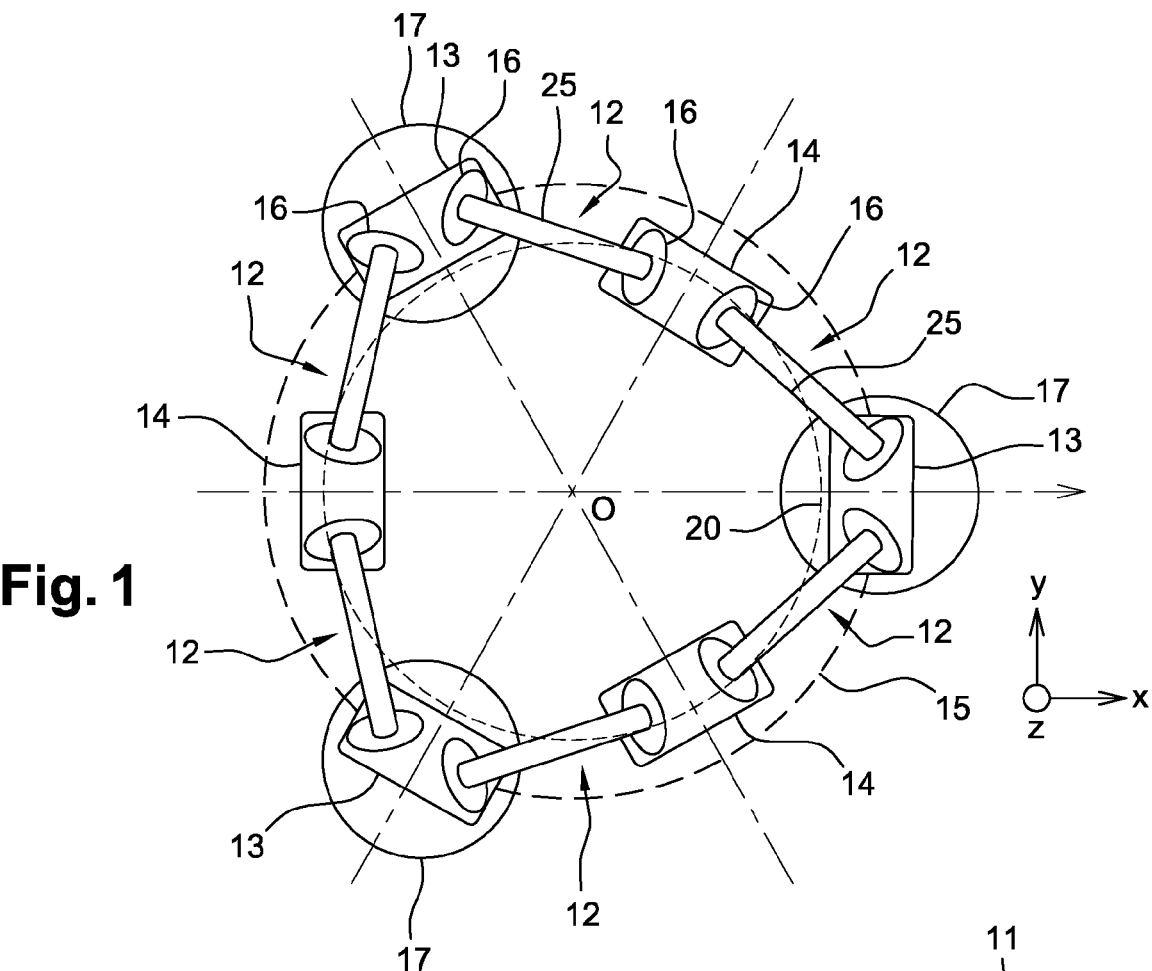
FIG. 1: a top view of a example of installation of a active/passive isolator such as described.

As can be seen in FIGS. 1, 2a and 2b, the hexapod comprises six identical isolation bars 12 forming a regular lattice.

Each bar 12, substantially cylindrical in shape, comprises an active element attached to the strictly structural portion of the bar. In this non-limiting example, the active element consists of a piezoelectric translator 25. Such piezoelectric translators 25 are commercially available and known to experts.

At each extremity 18, 19 of each bar 12, an elastomeric element 16 is positioned, with these elastomeric elements 16 constituting the end-fittings of the bars 12. The material, shape and size of these twelve elastomeric elements 16 of the bars are designed so to provide simultaneously a passive filtering function within a predefined frequency band, and a ball-joint function for the bars having to provide the isostaticity of the assembly.

The material, shape and size of each elastomeric element 16 of each bar 12 are calculated such that their bending stiffness is significantly weaker (typically weaker by at least one order of magnitude) than the corresponding stiffness of the rigid portion of said bars.

The passive filtering function along the six force and torque degrees of freedom between the anchor plate 11 that carries the equipment and the load-bearing structure 10 is determined to the first order by the stiffness and damping matrices (both in dimension six) of the lattice and of the elastomeric elements 16, with the bars 12 considered to be passive. With the flexibility exclusively localized at the elastomeric elements 16, all the degrees of freedom required are available to obtain the desired frequency filtering profile by varying the differential translation stiffness of the elastomeric elements 16 and the geometry of the lattice.

More specifically, it will be necessary to model and characterize the modal behavior of this passive structure, so as to determine the filtering profiles (force and torque transfer functions) and to verify that they fully meet the requirements tied to the nature and characteristics of the isolated equipment.

In this example, the elastomeric elements 16 take the form of a membrane in the shape of a hemispheric cap. These are also elements known to experts, designed to reject a predefined frequency band, e.g. above 20 Hz. For a given material, the optimization parameters can be, for example, the diameter and thickness of the hemispheric cap.

Using elastomeric elements 16 in the shape of cylindrical blocks (not shown in the figures) should lead to optimizing parameters such as the blocks' length and diameter. More generally, the optimum geometry for the elastomeric elements 16 is to be determined depending on the requirements and constraints relevant to each application.

Each bar 12 is mechanically connected, by means of the elastomeric element 16, to a lower block 13 at its lower extremity 18 and to an upper block 14 at its upper extremity 19. In this way, the six bars 12 rest on rigid lower blocks 13 and upper blocks 14, which provide the geometry of the assembly (positioning of the bars, inclination, etc.)

The elastomeric elements 16 are chosen such as to have negligible bending stiffness, suitable to ensure that each elastomeric element 16 behaves here as a hinged joint of the bar 12 on the associated supporting block 13, 14.

The lower blocks 13 are positioned on a lower circle 15 on the structure 10. Similarly, the upper blocks 14 are positioned on a second circle 20 on the anchor plate 11. The upper blocks 14 have an angular offset of 60° in relation to the lower blocks 13.

The lower blocks 13 are mounted on three force sensors 17, each measuring the forces along three perpendicular axes. They are, for example, piezoelectric sensors of a type known per se. The function of these force sensors 17 is to measure the complete torsor transmitted to the interface by the equipment that generates the vibrations so as to enable the calculation and implementation of the piezoelectric actuators' active control. This measurement is realized by means known to experts.

In a variant, the force sensors 17 can be positioned between the lower elastomeric elements 16 of the bars 12 and the lower blocks 13. In this case, each force sensor 17 measures the force transmitted along the axis of the corresponding bar 12.

The structure in question in this non-limiting example is designed to be placed on board a satellite and therefore to withstand the mechanical loads resulting from launch, then to operate in a zero-gravity environment.

So as to take into account the question of the vibration isolation device's resilience to launch, it is known conventionally that for elastomeric isolators, therefore of passive type, each module incorporates its own stops, which make it possible to limit the travel and the stresses in the suspension's elastomer blocks.

This type of integration cannot be realized with combined bars such as described in this example.

Because of this, a device to limit the travel of the hexapod is used in this example. The latter is used during the satellite's launch, it being assumed that said launch creates an acceleration along the vertical axis Z from top to bottom.

This travel limiting device works in parallel with the hexapod, by leaning on the suspended disruptive equipment (or on the equipment anchor plate 11).

Figure 3:
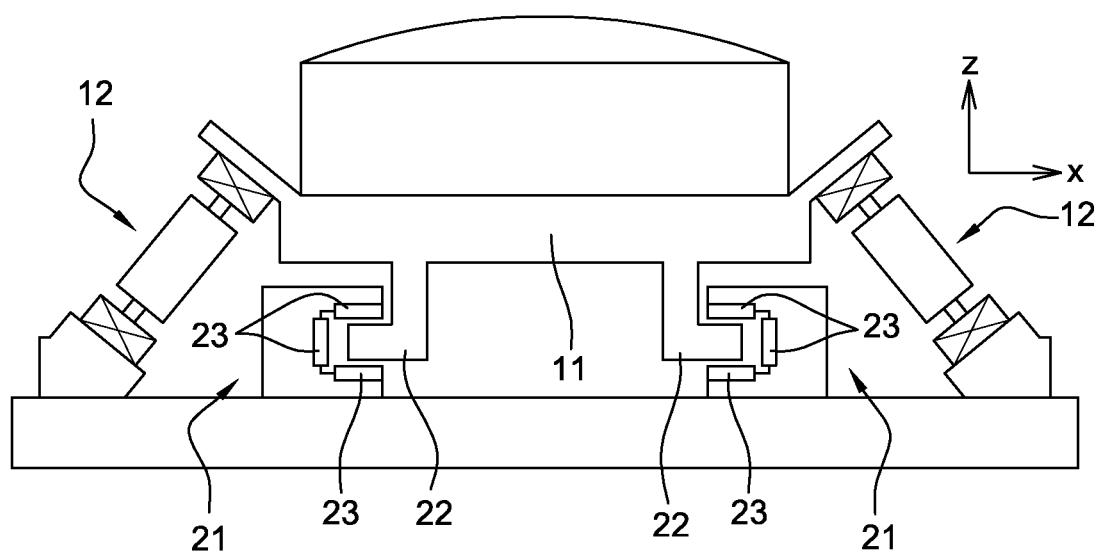
FIG. 3: a simplified installation schematic for the plots at launch.

As can be seen in FIG. 3, this device comprises a set of jaws 21, between which plots 22 fastened to the upper anchor plate 11 come to rest. Stops made of elastomer 23 are fastened to the inner surfaces of the jaws 21 and consequently limit the possible travel of the plots 22 both vertically and laterally. These stops are known to experts.

In this implementation example, the device for limiting travel comprises three jaws 21 positioned angularly at 120° from one another in the horizontal plane, so as to limit the travel of the disruptive equipment in relation to the structure on the three axes, in translation or in rotation.

The size of the plots 22, jaws 21 and elastomer stops 23, as well as the choice of their manufacturing material are linked in particular to the mass of the disruptive element and to the mechanical stresses at launch.

In addition the jaws 21 are designed such that the space between the elastomer stops 23 and the plots 22, in orbital flight conditions, is always greater than the maximum amplitude of the vibrations that the isolation device that is the subject of the invention must dampen. In other words, the tolerances of these elastomer stops 23 are determined so as to limit the shocks at launch, without disrupting the nominal operation of the vibration isolation device in operating conditions.

The deformation tolerances of the elastomeric elements 16 of the hexapod bars (acting as isolating elements and hinge joints) are much larger than those of mechanical elements (strips, metal membranes) exerting an equivalent hinge joint function and make this solution of relaying by secondary elastomer stops 23 possible with harder elastomeric materials.

In this example, the active control device (not shown in figures) uses the information from the torsor measured by the force sensors 17 near the lower supporting blocks 13 to prepare the force command of the piezoelectric translators 25 of the six bars 12.

In a first variant, a "wide band"-type control is implemented. A multi-variable closed-loop control law is prepared in conventional manner, based on the transfer matrix between the forces delivered by the piezoelectric translators 25 and the measurements or the sensors 17 used. This control law can be installed as an algorithm in a computing means (not shown in the figures) designed to send control commands to the piezoelectric translators 25. In theory, this solution is applicable to any type of disruption, but its effectiveness appears to be lower on equipment that produces a spectrum of harmonic vibrations.

Also, in a second variant, a narrow band antiphase type of control is implemented. This solution is particularly suited to a disruptive piece of equipment that generates one or two harmonic rays at fixed or slowly-varying frequencies (wheels turning at high speed, gyroscopic actuators, cryogenerators, etc.)

Benefits of the Invention

Figure 4:
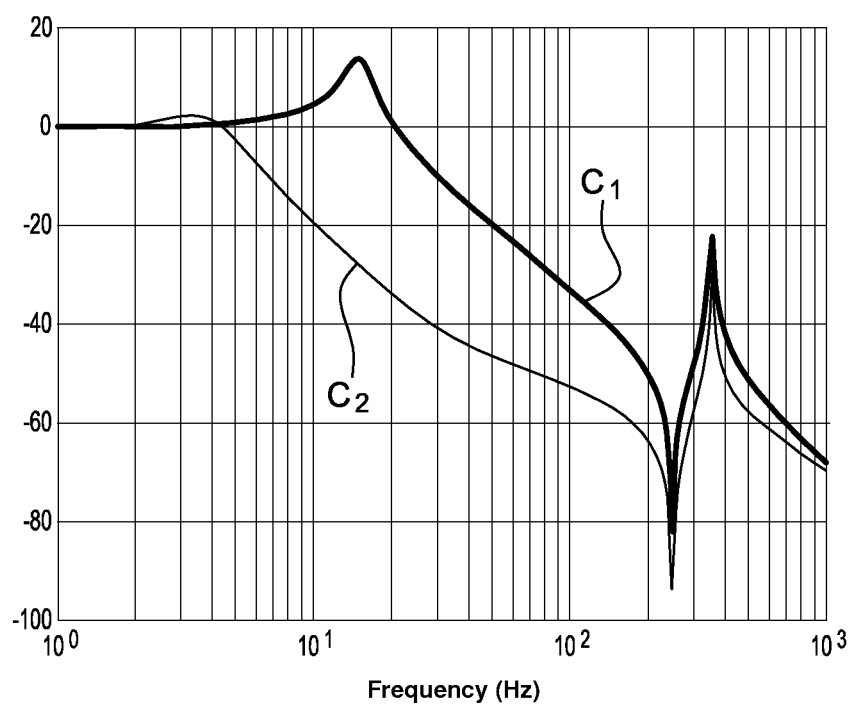
FIG. 4: theoretical rejection performance curves without and with active control.

FIG. 4 is a Bode plot that highlights a theoretical performance, reachable in closed-loop wide band with this device. In this FIG. 4, the x-axis represents frequency and the y-axis represents the attenuation of the disruptive force (in dB), along one of the isolator's axes. The upper curve C1 corresponds to the case of entirely passive, conventional isolation. The lower curve C2 represents the attenuation observed with a device combining active and passive isolation, according to the invention.

It should be noted that the calculations used for this representation were carried out with a system simplified to a single degree of freedom.

The combined effect can be seen of passive filtering by the elastomeric elements 16, which reject the high frequency disruptions, whereas the active loop utilized by the piezoelectric translators 25 of the bars 12 makes it possible to reduce the isolator overtension and to increase gain at intermediate frequencies. A significant gain is noted between 5 and 200 Hz, with a gain of more than 20 dB between 10 and 100 Hz.

The rise seen in the curve around 350 Hz corresponds here to a specific mode of the suspended equipment, which was taken into account in designing the control law (stability constraints).

This concept brings the following improvements to the state of the art:
- realization of a double stage of passive isolation, by placing two sets of elastomeric elements 16, 23 in series;
- integration of passive and active functions by mounting the elastomeric elements 16 in the active bar 12 in series, on either side of the piezoelectric translators 25;
- the double role of the hexapod's elastomeric elements 16, which provide both a passive isolation function and a flexible hinge joint function;
- the possibility of realizing a relatively simple relay system at launch by means of elastomer stops 23.

The invention's architecture makes it easily applicable to the two types of isolation problems, i.e.:
- isolating a disruptive source so as to minimize the parasitic forces transmitted to the load-bearing structure;
- isolating a sensitive piece of equipment by reducing the effect of the disruptions induced by the load-bearing structure.

In the first case, load cells, positioned in series between the load-bearing structure 10 and the isolator, will preferably be used as the sensor 17; in the second case, accelerometers, positioned next to the sensitive equipment on the upper anchor plate 11 of the isolation device (see FIG. 2b), will be used preferably as sensors 17.

In addition, the solution described in this invention makes it possible to simplify the design of the hinge joints and of relaying forces at launch, by incorporating elastomer solutions with stops 23 in parallel.

It is understood that, the choice that was made, in the device described, of a hexapod comprising hinge joints, materialized by the elastomeric elements 16 at the extremities of each of the bars 12, makes it possible to maintain isostatic mounting conditions between the structure and the disruptive element.

In the case of mounting elastomeric elements 16 at both extremities of the bars 12, the device has the additional advantage of a double passive isolation stage, which improves the high frequency rejection performance.

Variants of the Invention

The scope of this invention is not limited to the details of the embodiments considered above as an example, but on the contrary extends to modifications in the reach of the expert.

For example, the lattice of active bars 12 can be other than a regular hexapod such as described here. It is advantageous, however, to always have a lattice of six bars 12, making it possible to isolate the disruptions along the six degrees of freedom at the interface between the anchor plate 11 that carries the equipment and the load-bearing structure 10.

The active bars 12 may only have one elastomer end-fitting. In this case, all the end-fittings must be on a same side of the bars 12, either on their upper portion (closest to the anchor plate 11) or on their lower portion (closest to the structure 10).

The mechanical interface between the lattice of bars 12 and the structure 10 is shown as three lower blocks 13 on which the lower extremities 18 of the bars 12 are fastened. However, other realizations are also possible, such as, for example, using a single substantially cylindrical part on which said lower extremities 18 would be fastened. In this case, the force sensors 17 would be positioned in series in the transmission path of the vibrations, between the actuator 25 of each bar 12 and said cylindrical part, advantageously between the base of the elastomeric element 16 and its fastening point on said part.

The invention claimed is:

1. A vibration isolation device designed to be positioned between a structure (10) and an equipment anchor plate (11), said device comprising:
   a lattice made of isolation bars, with each isolation bar comprising at least one axial actuator (25),
   the lattice being an active hexapod comprising six identical isolation bars (12) positioned according to a regular geometry,
   the isolation six bars (12) being arranged such that the control of tension-compression forces in each of the six isolation bars (12) makes force and torque control of six separate degrees of freedom at an interface between the structure and the equipment, so as to produce effective isolation along all six degrees of freedom,
   wherein at least one end-fitting of each isolation bar consists of an elastomeric element (16) made of elastomeric material, wherein each actuator is an actively-controllable piezoelectric translator, thereby the six actuators being actively-controllable on all six degrees of freedom,
   in combination with the structure (10) and the equipment anchor plate (11), wherein,
   each end of each isolation bar includes the elastomeric element, each elastomeric element is an elastomeric block that provides a passive filtering function within a predefined frequency band, and a first elastomeric block of each isolation bar is attached to an upper supporting block and a second elastomeric block of each isolation bar is attached to a lower supporting block, the lower blocks being positioned on a lower first circle on the structure, and the upper blocks being positioned on a second circle on the equipment anchor plate, the upper blocks being angularly offset in relation to the lower blocks.

2. The device according to claim 1, wherein the isolation bars have only one elastomer end-fitting and all the end-fittings are positioned on the same side, as close as possible to the structure (10) or as close as possible to the anchor plate (11).

3. The device according to claim 1, wherein the two end-fittings of each isolation bar consist of elastomeric elements (16).

4. The device according to claim 1, wherein the material, shape and size of each elastomeric element (16) of each isolation bar (12) are calculated such that their bending stiffness is significantly weaker than the corresponding stiffness of the rigid portion of said isolation bars.

5. The device according to claim 1, further comprising at least one sensor (17) that measures effects of disruptive forces transmitted to the structure (10).

6. The device according to claim 5, suitable for cases wherein the structure (10) is designed to carry a disruptive piece of equipment, and further comprising at least one sensor (17) measuring the effects of disruptive forces is positioned in series in the transmission path of the vibrations, between the actuator (25) of the isolation bars (12) and the structure (10).

7. The device according to claim 6, wherein said at least one sensor (17) is a load cell.

8. The device according to claim 5, suitable for cases wherein the structure (10) is designed to carry a piece of equipment sensitive to vibrations, wherein the at least one sensor (17) measuring the effects of disruptive forces is positioned on the anchor plate (11).

9. The device according to claim 8, wherein said at least one sensor (17) is an accelerometer.

10. The device according to claim 1, further comprising means of limiting the travel of the equipment in relation to the structure (10) in translation and in rotation, with these means working in parallel with the hexapod.

11. The device according to claim 1, further comprising an active control device that feeds back the information measured by at least one sensor (17) regarding the command of the axial actuators (25) of the isolation bars (12).

12. The device according to claim 1, wherein the material, shape and size of each elastomeric element (16) of each isolation bar (12) have a bending stiffness weaker by at least one order of magnitude than the corresponding stiffness of the rigid portion of said isolation bars.

13. The device according to claim 1, wherein each actuator is controllable piezoelectric actuator.

14. A vibration isolation device designed to be positioned between a structure (10) and an equipment anchor plate (11), said device comprising:

a lattice made of isolation bars, with each isolation bar comprising at least one axial actuator (25), the lattice being an active hexapod comprising six identical isolation bars (12) positioned according to a regular geometry, the isolation six bars (12) being arranged such that the control of tension-compression forces in each of the six isolation bars (12) makes force and torque control of six separate degrees of freedom at an interface between the structure and the equipment, so as to produce effective isolation along all six degrees of freedom, wherein at least one end-fitting of each isolation bar consists of an elastomeric element (16) made of elastomeric material, wherein each actuator is an actively-controllable piezoelectric translator, thereby the six actuators being actively-controllable on all six degrees of freedom, and wherein each end of each isolation bar includes the elastomeric element, and each elastomeric element is an elastomeric spherical cap membrane that provides a passive filtering function within a predefined frequency band.

* * * * *